United States Patent
Menke

(10) Patent No.: US 7,112,310 B2
(45) Date of Patent: Sep. 26, 2006

(54) UV-IRRADIATION DEVICE FOR TREATING FLUIDS, COMPRISING AN IMPROVED CLEANING DEVICE

(75) Inventor: Gerd Menke, Löhne (DE)

(73) Assignee: Wedeco AG Water Technology, (DE)

( * ) Notice: Subject to any disclaimer, the term of this patent is extended or adjusted under 35 U.S.C. 154(b) by 514 days.

(21) Appl. No.: 10/333,854

(22) PCT Filed: Jan. 10, 2002

(86) PCT No.: PCT/EP02/00177

§ 371 (c)(1),
(2), (4) Date: Jan. 23, 2003

(87) PCT Pub. No.: WO02/094721

PCT Pub. Date: Nov. 28, 2002

(65) Prior Publication Data

US 2003/0185727 A1    Oct. 2, 2003

(51) Int. Cl.
*B01J 19/08* (2006.01)
(52) U.S. Cl. .................... 422/186.3; 250/431; 250/436
(58) Field of Classification Search ............. 422/186.3; 250/431, 436
See application file for complete search history.

(56) References Cited

U.S. PATENT DOCUMENTS

| | | | |
|---|---|---|---|
| 3,182,191 A | 5/1965 | McFarland et al. | |
| 3,462,597 A * | 8/1969 | Young | 250/431 |
| 4,367,410 A * | 1/1983 | Wood | 250/431 |
| 4,922,114 A * | 5/1990 | Boehme | 250/436 |
| 5,401,474 A | 3/1995 | Hager et al. | |
| 5,528,044 A | 6/1996 | Hutchison | |
| 6,432,213 B1 * | 8/2002 | Wang et al. | 134/6 |

FOREIGN PATENT DOCUMENTS

CH     446 207    10/1967

\* cited by examiner

*Primary Examiner*—Kishor Mayekar
(74) *Attorney, Agent, or Firm*—Robert W Becker & Associates; Robert W Becker

(57) ABSTRACT

A UV irradiation device for the treatment of fluids has an improved device for the cleaning of the surfaces of the jacket tube with a number of lamp units that each have a radiation source and a jacket tube that surrounds the radiation source, whereby the lamp units are essentially cylindrical. A cleaning device has cleaning elements that annularly extend around the jacket tubes 3. Each jacket tube has at least one cleaning element, and the cleaning elements are displaceable in the longitudinal direction of the jacket tubes by at least one drive unit. The cleaning elements have an axially delimited, annular chamber that is open towards the surface of the jacket tubes. At least one elastomeric ring is disposed in the chamber.

14 Claims, 5 Drawing Sheets

UV-IRRADIATION DEVICE FOR TREATING FLUIDS, COMPRISING AN IMPROVED CLEANING DEVICE

BACKGROUND OF THE INVENTION

The present invention relates to a UV irradiation device. Such a device is known from U.S. Pat. No. 5,874,740.

Microbiologically contaminated liquids, such as, for example, waste water from clarification or sewage-treatment plants, are disinfected in a particularly environmentally protective manner by being treated with ultraviolet radiation. For this purpose, various irradiation devices are known in the state of the art. With numerous applications there is a problem that the lamp units of the irradiation devices become dirty from the outside.

In the aforementioned patent a device is therefore proposed according to which annular chambers surround the lamp ends. These chambers rest against the surface of the jacket tubes where they are sealed via two O-rings. The interior of the chambers is filled via a supply unit with a cleaning liquid, for example phosphoric acid. To clean the surface of the lamp unit, the chamber that is filled with cleaning liquid is now moved back and forth on the surface, as a result of which impurities that loosely adhere are supposed to be pushed away, and deposits that strongly adhere are supposed to be dissolved by the cleaning fluid.

In practice, this device functions only to a limited extent since the O-ring seals of the chamber are very sensitive to mechanical damage or deviations in dimensions relative to the surface of the jacket tube, and furthermore the chemical action of the cleaning fluid on the surface of the jacket tube is not sufficient, without mechanical assistance, to prevent the formation of deposits, or to remove such deposits. The reaction times are too short for this purpose. For mechanically removable deposits, this device is too expensive. The O-rings themselves have no significant cleaning effect since on the one hand their circular cross section forms a very acute contact angle with the jacket tube, and on the other hand with strongly adhering or abrasive deposits the O-rings tend to roll over them.

Cleaning devices that operate entirely mechanically are also known, for example from WO 98/27011. Here a cleaning ring is moved over the surface of the jacket tube in order to remove loosely adhering impurities. Where the impurities adhere much more strongly, the effect of this cleaning device is limited.

It is therefore an object of the present invention to provide a UV irradiation device that has an effective cleaning device that operates without the supply of chemicals.

SUMMARY OF THE INVENTION

This object is realized by a device having a plurality of lamp units, each of which is provided with a radiation source and a jacket tube that surrounds the radiation source, wherein the lamp units are essentially cylindrical; a cleaning device having cleaning elements that extend annularly or in a ring-like manner around the jacket tubes, wherein at least one cleaning element is associated with each jacket tube, wherein the cleaning elements are displaceable in a longitudinal direction of the jacket tube by at least one drive unit, and wherein each cleaning element is provided with an axially delimited, annular chamber that is open toward the surface of an associated jacket tube; and at least one ring disposed in each chamber, wherein the ring is made of elastomeric material and has a non-circular cross section, and wherein in a relaxed state the ring has an inner diameter that is less than or equal to the outer diameter of the jacket tube.

Because there is disposed in the chamber at least one ring made of an elastomeric material and having a non-circular cross section, with the inner diameter in the relaxed state being less than or equal to the outer diameter of the jacket tube, the mechanical cleaning of the surface of the jacket tube is intensified and the rolling of the ring over deposits is effectively avoided. The material is urged against the surface with a pre-stress, and is automatically adjusted when wear occurs. This device can effectively counteract the formation of deposits upon the surface of the jacket sleeve and can prevent them, even when there is a high content of lime in the water or wastewater that is to be treated.

If the material is a fluoro elastomer, for example the material VITON offered by the company DuPont Dow Elastomers, the ring is not only not sensitive to heat, oxidation, ozone effects, and ultraviolet radiation; it is furthermore mechanically very durable.

The ring preferably has a right-angled cross section, for example with a material thickness of about 1 mm and a width of 10 mm or more. With such dimensions, the pressure per unit area is particularly good due to the pre-stress.

If the cleaning elements, in the longitudinal direction of the jacket tube, have support means, especially polymeric or metal discs, that are disposed next to the end faces of the ring, and that counteract a deformation of the ring upon actuation of the cleaning elements, a deflection of the ring relative to the impurities that adhere to the surface is prevented. The cleaning effect is thus improved.

The support means can each, in particular, be helically wound, whereby the material of the support means has a flat, right-angled cross section and the inner diameter of the support means, in the relaxed state, is smaller than or equal to the outer diameter of the jacket tube, and respectively at least two helical threads are provided for each support means. Support means that are configured in this manner have proven to be satisfactory in practice not only for the support of the elastomeric rings but also for the stripping of coarse impurities that offer to the elastomeric ring alone a resistance that is too great.

In this connection, the support means can be essentially non-elastic and can be made of a halogenated hydrocarbon material. Particularly advantageous are support means of PTFE (polytetrafluoroethylene).

The chamber provided in the cleaning element is preferably a groove or recess that is provided from the inner side of the cleaning element and has a right-angle cross section, and into which is disposed a package comprising support means, ring, and further support means. A plurality of rings or a plurality of support means can also be provided. In the recess the package preferably has an axial play of 0 mm to 2 mm. In the radial direction, the packaging should have a radial play of 2 mm to 8, in particular approximately 5 mm, in the recess.

The ring of elastomeric material preferably has a thickness of 0.5 mm to 2 mm, in particular 0.8 mm. In the radial direction, the material of the ring preferably has an extension of 5 mm to 15 mm, in particular approximately 11 mm.

Embodiments of the present invention will be described subsequently with the aid of the drawings. Shown are:

DESCRIPTION OF PREFERRED EMBODIMENTS

Figure 1:
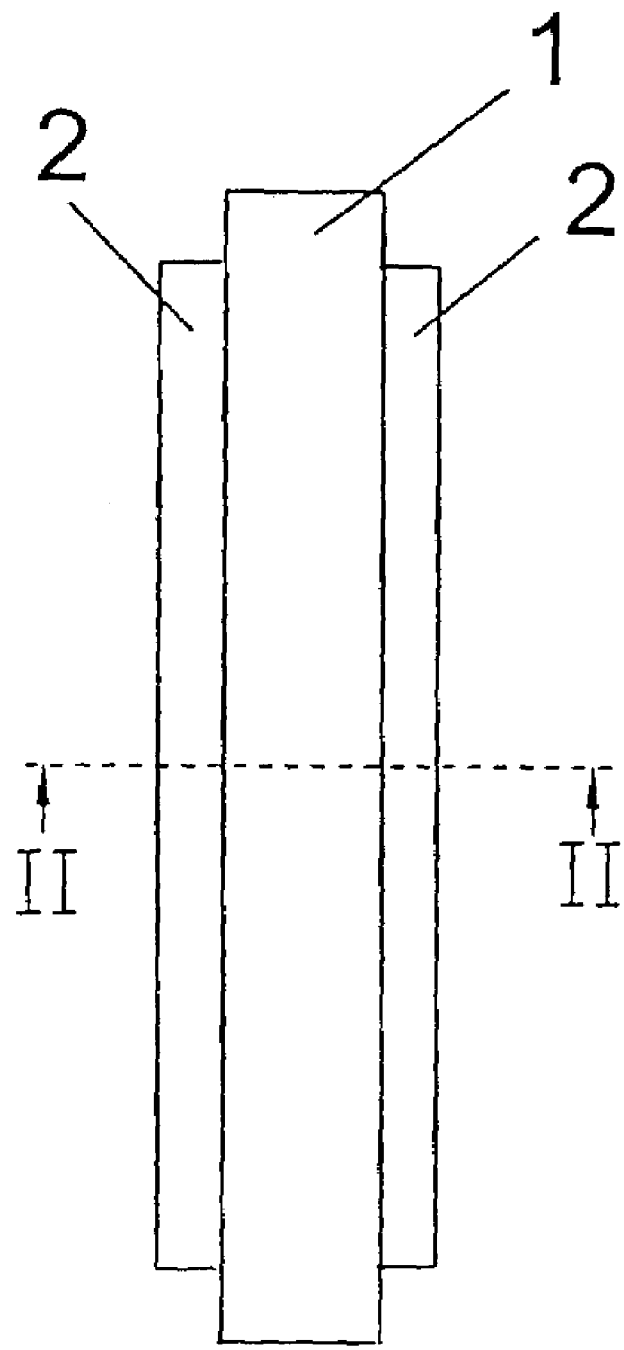
FIG. 1: A plan view, in the radial direction, of a cleaning element of an inventive UV irradiation device.

FIG. 1 shows a view of a cleaning element of an inventive UV irradiation device in the radial direction. The cleaning element is essentially axially symmetrical and has a central portion 1 of greater diameter that is delimited to both sides in the axial direction by a respective guide portion 2 of lesser outer diameter.

Figure 2:
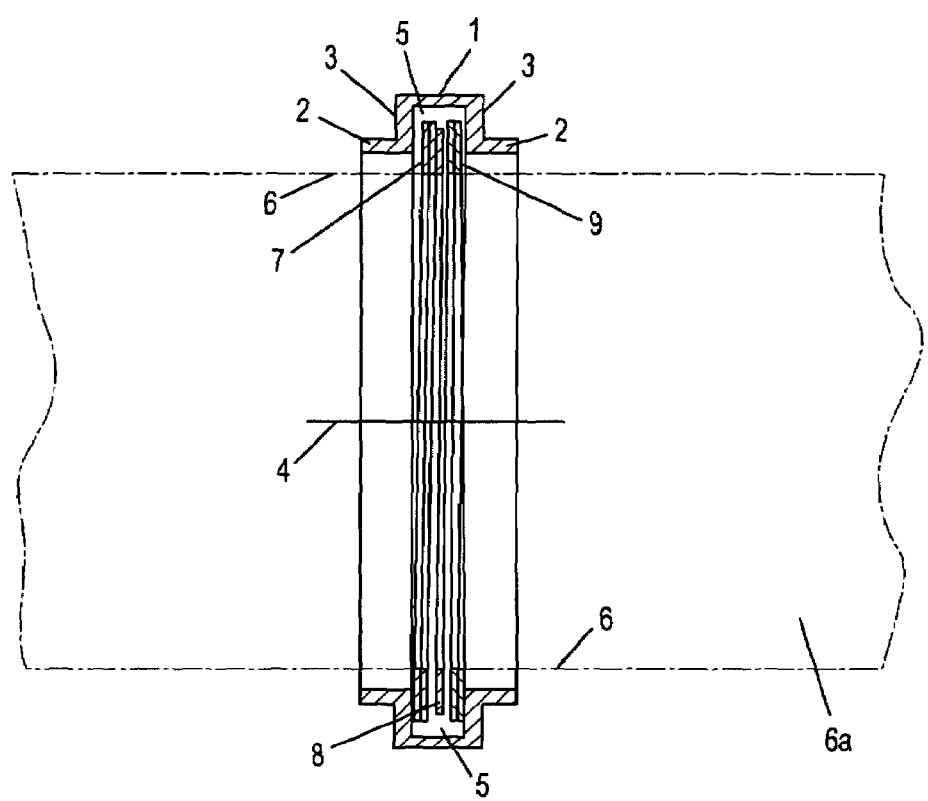
FIG. 2: A cross section along the central axis through the cleaning element of FIG. 1.

FIG. 2 is a cross section taken along the line II—II in FIG. 1.

The guide portions 2 are essentially tubular and are monolithic with the portion 1, whereby radially extending faces 3 form the transition between the guide portions 2 and the portion 1.

The faces 3 and the peripheral surface of the portion 1 delimit between them a groove or a recess 5 that is open toward an axis 4 and that has a nearly square cross section. The reference numeral 6 indicates the outer surface line of a jacket tube that during operation carries the cleaning element.

Disposed in turn in the recess 5 is a package comprised of a support element 7, a ring 8 and a further support element 9.

The support elements 7 and 9 have essentially the same construction. They are formed from a strip-shaped, helically wound material that has a flat, right-angled cross section and that is wound about the axis 4 in the form of an approximately double-strand screw. In this connection, the helical threads rest against one another. The extension of the material of the support elements 7 and 9 in the radial direction is approximately 5 times as great as the thickness. In the relaxed state, the respective support element is disposed with radial play in the recess 5.

The ring 8 is disposed between the two support elements 7 and 9. The ring 8 is formed of an elastomeric material, and has a ratio between the width b in the radial direction and the thickness d in the axial direction of approximately 5:1 to 6:1.

Figure 3:
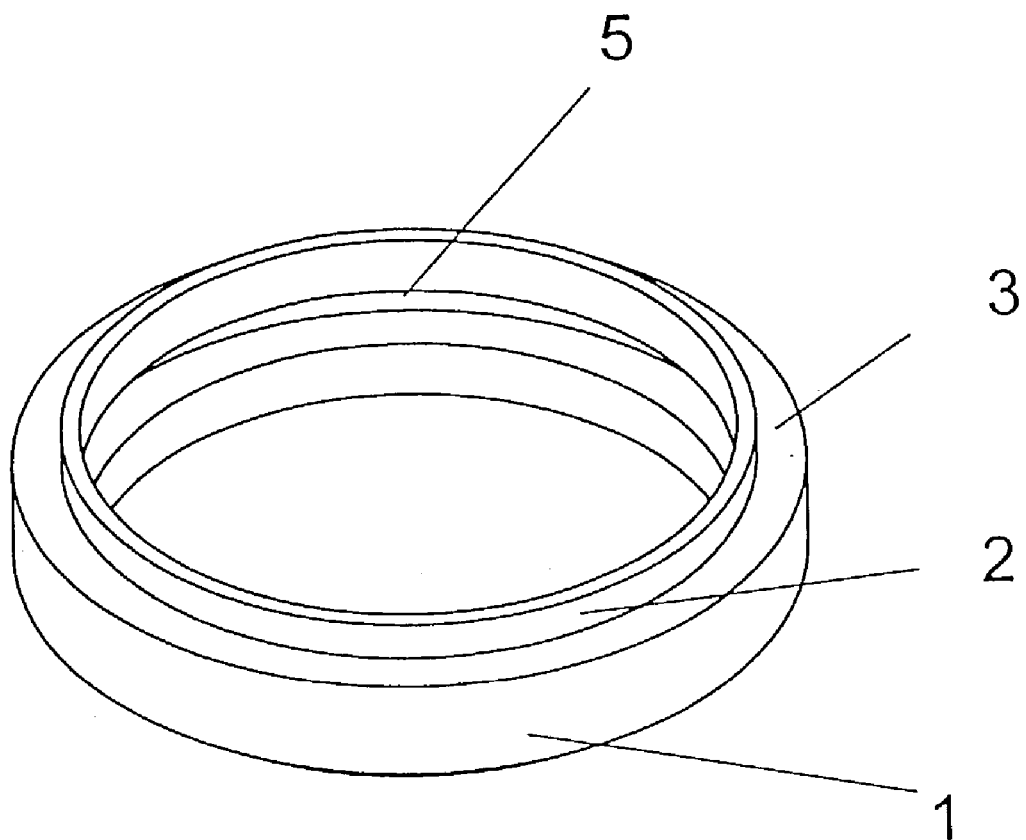
FIG. 3: A perspective illustration of a cleaning element without the inserted support elements and ring.

FIG. 3 shows the main body of the cleaning element of FIG. 1 and FIG. 2 in a perspective view without the inserted package comprised of the support elements 7,9 and the ring 8.

Figure 4:
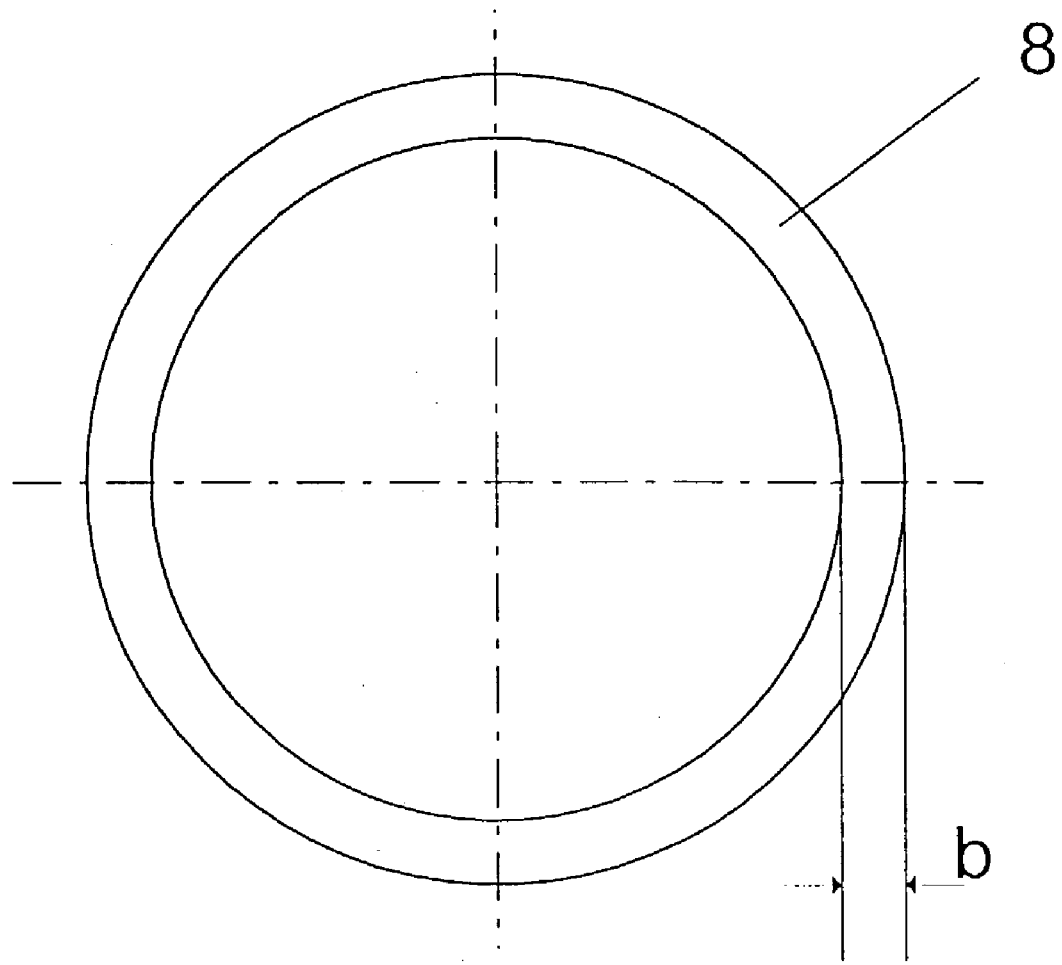
FIG. 4: The ring of the cleaning element of FIG. 2 in an axial plan view.

FIG. 4 shows the ring 8 in plan in the direction of the axis 4. The dimension b of the width of the material is illustrated.

Figure 5:
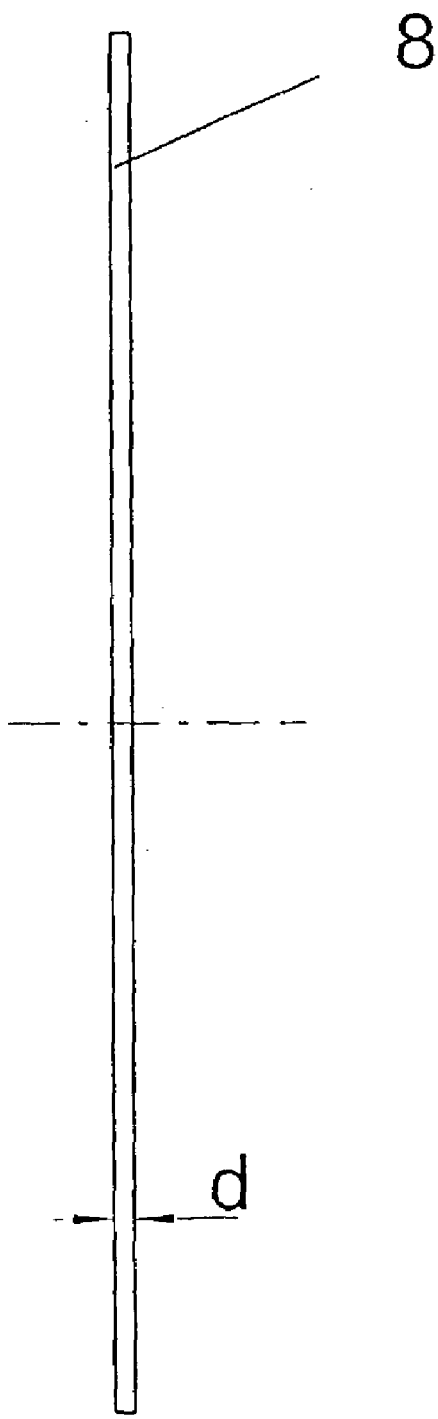
FIG. 5: A view of the ring of FIG. 4 in the radial direction.

FIG. 5 shows the ring 8 of FIG. 4 in a radial view, in which the dimension d is illustrated.

On the whole, there results a cleaning system of high efficiency and reliability. A reliable cleaning of the surfaces in ensured even for stubborn or rapidly growing deposits, such as are to be expected with wastewaters having a high lime content. The ring thus has the configuration of a planar circular ring.

With this concrete embodiment, the UV irradiation device is provided with jacket tubes 6 that have an outer diameter of 48 mm. The inside of the jacket tube is indicated by the reference numeral 6a in FIG. 2. The cleaning element, more precisely the main body illustrated in FIG. 3, has an inner diameter of 52 mm, so that an adequate play is present in the radial direction. The box-shaped recess 5 has dimensions of 5.5 mm in the direction of the axis 4 and 4.5 mm in the radial direction. In the direction of the axis 4 the cleaning element has an overall extension of 15 mm. It is preferably made of PETP (polyethyleneterephthalate).

The support elements 7 and 9 are preferably made of PTFE (polytetrafluoroethylene) and are dimensioned such that in the non-stressed state, in which the cleaning device is not placed upon the jacket tube 6, the inner diameter is slightly less than the outer diameter of the jacket tube 6, which in the present embodiment is an approximately 47 mm inner diameter. The same applies for the ring 8.

This ring has an inner diameter of 47.2 mm, while the thickness is 0.8 mm and the width of the material is 5 mm. The material is preferably a fluoro elastomer, for example the polymerizate of vinylfluoride and hexafluoropropylene offered under the mark VITON.

During operation, the cleaning element, as illustrated in FIG. 2, is placed over the jacket tube 6. It is engaged on both sides of the faces 3 by a forked drive element and is periodically moved over the entire surface of the jacket tube by a control means as a function of time or pursuant to some other criteria. In so doing, the package comprised of the support elements 7 and 9 and the ring 8 can adapt to the shape of the jacket tube 6. The support elements 7 and 9 can assume fluctuations of the diameter in that the helical spiral defined by them more or less expands. This is also possible if the material selected is PTFE, which itself is not elastic. The ring 8 is of elastomeric material and can therefore also follow the surface contour of the jacket tube 6. The main body of the cleaning element guides the package 7,8,9 only in the direction of the axis 4. In the radial direction the package is freely movable within the recess in the framework of the radial play.

During the cleaning movement, the support elements 7, 9 keep the ring 8 from twisting, which, due to the friction upon the surface of the jacket tube 6, is liable to occur if the support elements 7,9 are not present. However, a slight deformation of the ring 8 can be advantageous because that leads to the formation of a stripping edge relative to the jacket tube. The support effect is enhanced by the slight axial play. The cross-sectional relationships of the ring 8, together with the elastomeric properties, effect a pressure of the ring 8 against the surface of the jacket tube 6, which due to the slight thickness of the ring 8 leads to a relatively great surface pressure. The cleaning of the surface of the jacket tube 8 by the described cleaning element therefore leads to a good result, which with the inventive UV irradiation unit in turn leads to an improved operational reliability and a good UV radiation output over the duration of operation.

Pursuant to other embodiments, a plurality of rings 8 and/or support elements 7,9 could be utilized. Materials and dimensions can be adapted to other conditions of use.

The specification incorporates by reference the disclosure of German priority document DE 101 25 507.1 filed May 23, 2001.

The present invention is, of course, in no way restricted to the specific disclosure of the specification and drawings, but also encompasses any modifications within the scope of the appended claims.

The invention claimed is:

1. A UV irradiation device for treating fluids, comprising:
   a plurality of lamp units, each of which is provided with a radiation source, and a jacket tube that surrounds the radiation source, wherein said lamp units are essentially cylindrical;
   a cleaning device having cleaning elements that extend annularly around said jacket tubes, wherein at least one cleaning element is associated with each jacket tube, wherein said cleaning elements are displaceable in a longitudinal direction of said jacket tubes by at least one drive unit, and wherein each cleaning element is provided with an axially delimited, annular chamber that is open toward a surface of an associated jacket tube; and at least one ring disposed in each chamber, wherein said ring is made of elastomeric material and has a non-circular radial cross section, and wherein said ring, in a relaxed state, has an inner diameter that is less than or equal to an outer diameter of said jacket tube, wherein in the longitudinal direction of said jacket tube, said cleaning elements are provided with support means that are disposed adjacent to end faces of said ring and that are configured to counteract deformation of said ring upon actuation of said cleaning elements.

2. A UV irradiation device according to claim 1, wherein said material of said ring is a fluoro elastomer.

3. A UV irradiation device according to claim 1, wherein said ring has a right-angled radial cross section.

4. A UV irradiation device according to claim 1, wherein said support means are polymeric or metal support means.

5. A UV irradiation device according to claim 1, wherein each of said support means is helically wound, wherein said support means are made of a material having a flat, right-angled radial cross section, wherein said support means, in a relaxed state, have an inner diameter that is less than or equal to the outer diameter of said jacket tube, and wherein each of said support means is provided with at least two helical threads.

6. A UV irradiation device according to claim 1, wherein said support means are made of a halogenated hydrocarbon.

7. A UV irradiation device according to claim 1, wherein said chamber of said cleaning element is a recess provided on an inwardly directed side of said cleaning element and has a right-angled radial cross section, and wherein disposed in said recess is a package comprising a first support means, one of said rings, and further support means.

8. A UV irradiation device according to claim 7, wherein said package has an axial play in said recess of 0 mm to 2 mm.

9. A UV irradiation device according to claim 7, wherein said package has a radial play in said recess of 2 mm to 8 mm.

10. A UV irradiation device according to claim 9, wherein said radial play is approximately 5 mm.

11. A UV irradiation device according to claim 7, wherein said ring has a thickness of 0.5 mm to 2 mm.

12. A UV irradiation device according to claim 11, wherein said thickness is 0.8 mm.

13. A UV irradiation device according to claim 7, wherein the material of said ring has a radial width of 5 mm to 15 mm.

14. A UV irradiation device according to claim 13, wherein said radial width is approximately 11 mm.

* * * * *